(12) United States Patent
Geis et al.

(10) Patent No.: US 11,619,258 B2
(45) Date of Patent: Apr. 4, 2023

(54) SLIDING BEARING, METHOD FOR PRODUCING A SLIDING BEARING, INTERNAL COMBUSTION ENGINE HAVING A SLIDING BEARING AND ELECTRIC MACHINE HAVING A SLIDING BEARING

(71) Applicant: Mahle International GmbH, Stuttgart (DE)

(72) Inventors: Armin Geis, Wailingen (DE); Andreas Gutmann, Zell im Wiesental (DE); Lilia Kurmanaeva, Schopfheim (DE); Alexander Puck, Esslingen (DE); Patrick Sutter, Schopfheim (DE); Klaus Wintrich, Schopfheim (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/191,680

(22) Filed: Mar. 3, 2021

(65) Prior Publication Data
US 2021/0277936 A1 Sep. 9, 2021

(30) Foreign Application Priority Data
Mar. 4, 2020 (DE) .......................... 102020202738.2

(51) Int. Cl.
*F16C 33/10* (2006.01)
*F16C 33/12* (2006.01)
(Continued)

(52) U.S. Cl.
CPC ................ *F16C 17/02* (2013.01); *B22F 3/26* (2013.01); *C22C 1/0475* (2013.01);
(Continued)

(58) Field of Classification Search
CPC ...... F16C 17/02; F16C 33/104; F16C 33/128; F16C 33/145; F16C 2202/10;
(Continued)

(56) References Cited

U.S. PATENT DOCUMENTS

| | | |
|---|---|---|
| 5,054,301 A | 10/1991 | Soga et al. |
| 5,259,860 A | 11/1993 | Ikenoue et al. |

(Continued)

FOREIGN PATENT DOCUMENTS

| | | | | |
|---|---|---|---|---|
| CN | 102356249 A | * | 2/2012 | ............ B22F 1/0003 |
| CN | 113217542 A | * | 8/2021 | |

(Continued)

OTHER PUBLICATIONS

English abstract for DE-102009052302.
English abstract for DE-102013203443.
English abstract for JP-H11-335798.

*Primary Examiner* — Phillip A Johnson
(74) *Attorney, Agent, or Firm* — Fishman Stewart PLLC

(57) ABSTRACT

A sliding bearing may include an uncoated shaft and a bearing bush. The uncoated shaft may include a shaft material. The bearing bush may include a sintered bearing bush material. The shaft may be slidingly and moveably guided, relative to the bearing bush, within the bearing bush. The bearing bush material may have a residual porosity of 8 percent or more. A volume of the residual porosity may be filled with an oil up to 80 percent or more.

21 Claims, 1 Drawing Sheet

(51) Int. Cl.
*F16C 33/14* (2006.01)
*F16C 17/02* (2006.01)
*C22C 19/05* (2006.01)
*C22C 33/02* (2006.01)
*C22C 38/00* (2006.01)
*C22C 38/16* (2006.01)
*C22C 1/04* (2023.01)
*B22F 3/26* (2006.01)

(52) U.S. Cl.
CPC ........ *C22C 19/058* (2013.01); *C22C 33/0214* (2013.01); *C22C 33/0242* (2013.01); *C22C 38/008* (2013.01); *C22C 38/16* (2013.01); *F16C 33/104* (2013.01); *F16C 33/128* (2013.01); *F16C 33/145* (2013.01); *F16C 2202/10* (2013.01); *F16C 2204/66* (2013.01); *F16C 2220/20* (2013.01)

(58) Field of Classification Search
CPC .............. F16C 2204/52; F16C 2204/66; F16C 2220/20; C22C 1/0475; C22C 19/058; C22C 33/0214; C22C 33/0242; C22C 38/008; C22C 38/16; B22F 3/26
See application file for complete search history.

(56) References Cited

U.S. PATENT DOCUMENTS

| | | | | |
|---|---|---|---|---|
| 2005/0286822 | A1* | 12/2005 | Maruyama | F16C 17/02 384/283 |
| 2008/0146467 | A1* | 6/2008 | Takayama | F16C 33/121 508/105 |
| 2015/0267747 | A1* | 9/2015 | Iwata | F16C 33/208 428/613 |
| 2019/0345980 | A1* | 11/2019 | Ishii | B22F 5/106 |
| 2021/0285491 | A1* | 9/2021 | Arai | F16C 17/02 |

FOREIGN PATENT DOCUMENTS

| | | | | |
|---|---|---|---|---|
| DE | 1044131 B | | 11/1958 | |
| DE | 69116638 T2 | | 9/1996 | |
| DE | 102009052302 A1 | | 5/2011 | |
| DE | 102013203443 A1 | | 8/2014 | |
| GB | 2216545 A | * | 10/1989 | .............. B22F 1/025 |
| JP | H11-335798 A | | 12/1999 | |
| JP | 6536866 B1 | * | 7/2019 | ............... B22F 5/00 |
| KR | 20120129001 A | * | 11/2012 | |
| WO | WO-2007086621 A1 | * | 8/2007 | ............... B22F 7/04 |
| WO | WO-2015037509 A1 | * | 3/2015 | ............... B22F 5/106 |
| WO | WO-2018062357 A1 | * | 4/2018 | ............... B22F 3/12 |

* cited by examiner

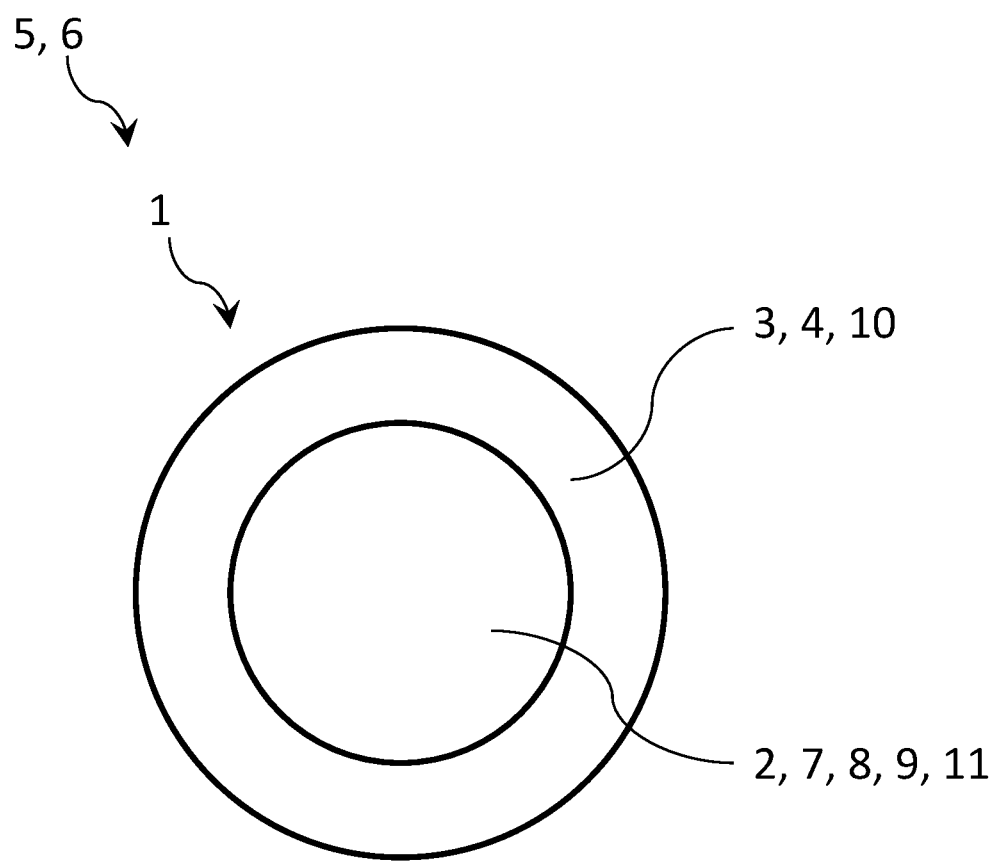

SLIDING BEARING, METHOD FOR PRODUCING A SLIDING BEARING, INTERNAL COMBUSTION ENGINE HAVING A SLIDING BEARING AND ELECTRIC MACHINE HAVING A SLIDING BEARING

CROSS-REFERENCE TO RELATED APPLICATIONS

This application claims priority to German Patent Application No. DE 10 2020 202 738.2, filed on Mar. 4, 2020, the contents of which is hereby incorporated by reference in its entirety.

TECHNICAL FIELD

The invention relates to a sliding bearing and to a method for producing such a sliding bearing. Apart from this, the invention relates to an internal combustion engine having such a sliding bearing and an electric machine having such a sliding bearing.

BACKGROUND

Sliding bearings, in particular for internal combustion engines or electric machines, have been embodied for some time with bearing bushes comprising a sintered bearing bush material, in which bearing bushes a shaft of the sliding bearing is slidingly and, relative to the bearing bush, moveably received. In the case of such sliding bearings with bearing bushes comprising a sintered bearing bush material coated shafts are generally employed in order to improve sliding properties, wear resistance and/or temperature resistance of the shaft. Such a coating of the shaft is usually a chrome-plating.

Since conventional chrome-plating has been prohibited in the EU since 2017, different alternatives to chrome-plating are currently being discussed. Apart from this, the coating of the shaft material of the shaft disadvantageously requires an additional and expensive manufacturing step which has a cost-driving effect on the manufacturing costs of the sliding bearing with the shaft and the sintered bearing bush.

SUMMARY

It is therefore an object of the present invention to show new ways for sliding bearings and for methods for producing such a sliding bearing, for internal combustion engines having such a sliding bearing and for electric machines having such a sliding bearing—in particular for eliminating the disadvantage shown above.

This object is solved through the subject matter of the independent claim(s). Preferred embodiments form the subject matter of the dependent patent claim(s).

Accordingly, the basic idea of the invention with a sliding bearing, which includes a bearing bush comprising a sintered bearing bush material and a shaft that is moveably guided in the bearing bush, is to form the shaft uncoated and with a shaft material present in a bright state. There, the sintered bearing bush material of the sliding bearing is impregnated with oil.

Tests have surprisingly shown that in sliding bearings with a sintered bearing bush impregnated with oil good sliding properties and a good wear resistance can also be achieved when an uncoated shaft of the sliding bearing is employed. Advantageously, while overcoming a technical preconception according to which such a use of an uncoated shaft has not been considered to date, a cost-intensive coating of the shaft can thus be saved by means of the sliding bearing according to the invention.

A sliding bearing according to the invention, which can be preferentially employed for an internal combustion engine or an electric machine, includes an uncoated shaft. The shaft of the sliding bearing comprises a shaft material, preferentially present in the bright state. Apart from this, the sliding bearing includes a bearing bush which comprises a sintered bearing bush material. The bearing bush material of the bearing bush is preferentially based on iron. In the bearing bush of the sliding bearing, the shaft of the sliding bearing is slidingly and, relative to the bearing bush, movably guided. The shaft is preferentially axially and/or rotatably mounted on the bearing bush. The bearing bush material of the bearing bush has a residual porosity of at least 8 percent. The percentage of the residual porosity in the bearing bush material can be determined by means of an image analysis of a, preferentially etched, micro-section of the bearing bush material. A volume of the residual porosity of the bearing bush material is up to at least 80 percent filled with an oil. Practically, this oil is a mineral oil, a synthetic oil or a silicone oil. Advantageously, as already shown before, a coating of the shaft, which is typically cost-intensive, can be saved in such a sliding bearing while achieving good sliding properties and a good wear resistance, so that the manufacturing costs of the sliding bearing can be reduced.

Practically, the volume of the residual porosity of the bearing bush material is up to at least 90 percent filled with the oil. Advantageously, a particularly favourable ease of motion of the sliding bearing can be achieved by way of this.

In an advantageous further development of the sliding bearing, the bearing bush material has a composition shown in the following. The bearing bush material comprises carbon with a content of 1.8 to 2.2 percent by weight as well as phosphorus with a content of 0.2 to 0.5 percent by weight. Apart from this, the sliding bearing includes a content of copper of 3.5 to 5 percent by weight and a content of tin with 0.4 to 0.6 percent by weight. Apart from this, the sliding bearing comprises a residual component. A bearing bush of such a bearing bush material advantageously offers particularly good sliding properties.

According to a further advantageous further development, the bearing bush material alternatively corresponds to a composition shown in the following. The bearing bush material comprises carbon with a content of 0.8 to 1.3 percent by weight. Furthermore, the bearing bush material includes sulphur with a content of 0.2 to 0.4 percent by weight and 1.3 to 2.5 percent by weight of nickel and 0.8 to 1.2 percent by weight of molybdenum. Apart from this, the bearing bush material comprises a manganese content of 0 to 0.5 percent by weight and a residual component. Such a bearing bush material advantageously proves to be particularly wear-resistant.

According to a further preferred further development of the sliding bearing, the sintered bearing bush material of the bearing bush has a density of 6.2 to 6.8 g per cm$^3$. Such a bearing bush material is advantageously sufficiently porous in order to be impregnated with oil.

In a further advantageous further development of the sliding bearing, the shaft material of the shaft of the sliding bearing has a composition explained in the following. The shaft material includes carbon with a content of 0.4 to 0.5 percent by weight and a silicon content of 2.7 to 3.3 percent by weight. Apart from this, the shaft material includes manganese with a content of 0 to 0.6 percent by weight and chromium with a content of 8 to 10 percent by weight.

Furthermore, the shaft material comprises a content of nickel of 0 to 0.5% by weight and phosphorus with a content of 0 to 0.04 percent by weight. The shaft material includes a content of sulphur of 0 to 0.03 percent by weight and a residual component. Such a shaft material advantageously proves to be particularly temperature-resistant.

According to a further preferred further development of the sliding bearing, the shaft material alternatively has a composition explained in the following. The shaft material comprises carbon with a content of 0.45 to 0.55 percent by weight and a silicon content of 0 to 0.45 percent by weight. Furthermore, the shaft material includes a content of manganese of 8 to 10 percent by weight and chromium with a content of 20 to 22 percent by weight. The shaft material comprises nickel with a content of 3.5 to 5.5 and phosphorus with a content of 0 to 0.04 percent by weight. The shaft material includes sulphur with a content of 0 to 0.3 percent by weight and nitrogen with a content of 0.4 to 0.6 percent by weight. Apart from this, the shaft material comprises a content of niobium of 1.8 to 2.5 percent by weight as well as tungsten with a content of 0.8 to 1.5 percent by weight. Apart from this, the shaft material includes a residual component. Such a shaft material proves to be particularly wear and temperature-resistant.

According to a further advantageous further development of the sliding bearing, the shaft material alternatively has a composition described in the following. The shaft material comprises a content of carbon of 0 to 0.08 percent by weight and a content of silicon of 0 to 0.5 percent by weight. Apart from this, the shaft material comprises manganese with a content of 0 to 0.5 percent by weight and chromium with a content of 13.5 to 15.5 percent by weight. The shaft material more includes nickel with a content of 30 to 33.5 percent by weight and phosphorus with a content of 0 to 0.015 percent by weight. Apart from this, the shaft material includes sulphur with a content of 0 to 0.01 percent by weight and aluminium with a content of 1.6 to 2.2 percent by weight. Apart from this, the shaft material comprises niobium with a content of 0.4 to 0.9 percent by weight as well as titanium with a content of 2.3 to 2.9 percent by weight. Apart from this, the shaft material comprises a molybdenum content of 0.4 to 1.0 percent by weight and a residual component. Such a shaft material proves to be particularly corrosion-resistant.

A further advantageous further development of the sliding bearing provides that the shaft material alternatively corresponds to a composition shown in the following. The shaft material includes carbon with a content of 0.25 to 0.35 percent by weight as well as silicon with a content of 0 to 0.3 percent by weight. Apart from this, the shaft material comprises manganese with a content of 4 to 6 percent by weight as well as chromium with a content of 24 to 26 percent by weight. In addition to this, the shaft material includes nickel with a content of 10 to 13 percent by weight as well as phosphorus with a content of 0 to 0.2 percent by weight. Apart from this, the shaft material comprises sulphur with a content of 0 to 0.2 percent by weight and a content of aluminium of 0 to 0.5 percent by weight. In addition to this, the shaft material includes copper with a content of 0 to 0.5 percent by weight as well as niobium with a content of 1.8 to 2.5 percent by weight. Apart from this, the shaft material includes nitrogen with a content of 0.5 to 0.7 percent by weight and a residual component. Such a shaft material likewise proves to be particularly temperature-resistant.

Practically, the residual component of the bearing bush material and/or of the shaft material contains 26.315 percent by weight to 97.9 percent by weight. By way of this, particularly good mechanical properties of the bearing bush material or of the shaft material can be achieved.

According to an advantageous further development of the sliding bearing the residual component consists of iron and contaminations. In particular, these contaminations are contained in the residual component due to the manufacture. Such a bearing bush material has particularly good sliding properties and a particularly good wear resistance.

Practically, the remaining weight content of the remainder is formed by iron. Typically, iron is cost-effective in procurement which accordingly has a cost-lowering effect on the sintered bearing bush material per se.

According to a further advantageous further development of the sliding bearing, the shaft material alternatively has a composition explained in the following.

The shaft material comprises carbon with a content of 0 to 0.13 percent by weight as well as silicon with a content of 0 to 1 percent by weight. Apart from this, the shaft material comprises a manganese content of 0 to 1 percent by weight and chromium with a content of 18 to 21 percent by weight. Apart from this, the shaft material includes cobalt with a content of 15 to 21 percent by weight as well as phosphorus with a content of 0 to 0.015 percent by weight. In addition to this, the shaft material includes sulphur with a content of 0 to 0.02 percent by weight as well as aluminium with a content of 1 to 2 percent by weight. Apart from this, the shaft material comprises a content of copper of 0 to 0.02 percent by weight as well as titanium with a content of 2 to 3 percent by weight. In addition to this, the shaft material comprises zirconium with a content of 0 to 0.15 percent by weight and boron with a content of 0 to 0.02 percent by weight. Apart from this, the shaft material includes a content of iron of 0 to 1.5 percent by weight and a residual component. Such a shaft material proves to be particularly heat-resistant.

In a further advantageous further development, the residual component includes maximally 0.2 percent by weight of contaminations. Advantageously it can thus be ensured that the desired properties of the shaft material and of the bearing bush material are achieved.

According to a further advantageous further development of the sliding bearing, the shaft material is alternatively a case-hardened steel. This advantageously proves to be particularly cost-effective.

Apart from this, the invention relates to a method for producing a sliding bearing according to the invention in accordance with the above description. According to this method, the oil is introduced into the residual porosity in an impregnating operation for the at least one partial filling of the residual porosity of the sintered bearing bush material at a pressure of 1 mbar to 850 mbar, preferentially of 10 mbar to 250 mbar, and at an oil temperature of 42° Celsius to 97° Celsius, preferentially 60° Celsius to 90° Celsius. This makes possible a particularly good filling of the residual porosity with the oil.

In addition to this, the invention relates to an internal combustion engine, in particular for a motor vehicle, which comprises a gas exchange valve. This gas exchange valve comprises a valve stem. Apart from this, the internal combustion engine includes a sliding bearing according to the invention, as described above, whose shaft practically comprises the valve stem. There, the sliding bearing is preferentially produced by means of a method according to the invention in accordance with the above description. It is to be understood that the sliding bearing according to the invention of the internal combustion engine according to the invention can also be employed for the sliding mounting of any other contents of the internal combustion engine. The previously shown advantages of the sliding bearing according to the invention and of the manufacturing method according to the invention for manufacturing such a sliding bearing analogously apply also to the internal combustion engine according to the invention having such a sliding bearing.

Furthermore, the invention relates to an electric machine, preferentially for a motor vehicle, which includes a sliding bearing according to the invention in accordance with the above description. This sliding bearing of the electric machine is practically produced by means of a method according to the invention in accordance with the above description. In addition to this, the electric machine includes a stator and a rotor, wherein the rotor is rotatably mounted on the stator relative to the stator, in particular by means of the sliding bearing. It is to be understood that the sliding bearing according to the invention of the electric machine according to the invention can also be employed for the sliding mounting of any other contents of the electric machine. The advantages of the sliding bearing according to the invention mentioned above and of the method according to the invention for producing such a sliding bearing analogously apply also to the electric machine according to the invention having such a sliding bearing.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawing and are explained in more detail in the following description.

The FIGURE shows in a sectioned representation roughly schematically an example of a sliding bearing according to the invention.

DETAILED DESCRIPTION

The sliding bearing 1 can be employed for an internal combustion engine 5, which is likewise exemplarily shown in the FIGURE. Alternatively, the sliding bearing 1 can be employed for an electric machine 6, as is additionally illustrated in the FIGURE. The sliding bearing 1 includes an uncoated shaft 2. The shaft 2 includes a shaft material 7 present in the bright state. Apart from this, the sliding bearing 1 includes a bearing bush 3, which includes a sintered bearing bush material 4. The bearing bush material 4 of the bearing bush 3 can be based on iron. The shaft 2 is slidingly and, relative to the bearing bush 3, moveably guided in the bearing bush 3. In the shown example, the shaft 2, is axially and rotatably mounted on the bearing bush 3. The sintered bearing bush material 4 has a residual porosity of at least 8 percent. This content of the residual porosity can be determined by means of an image analysis of an, in particular etched, micro-section of the bearing bush material 4. A volume of the residual porosity of the bearing bush material 4 is at least up to 80 percent filled with an oil. The oil, with which the volume of the residual porosity is filled up to at least 80 percent, can be a mineral or a synthetic oil or a silicone oil. In the shown example, the volume of the residual porosity is up to at least 90 percent filled with oil.

The bearing bush material 4 in the shown example has a composition explained in the following. The bearing bush material 4 includes a content of carbon of 1.8 to 2.2 percent by weight. Apart from this, the bearing bush material 4 includes phosphorus with a weight content of 0.2 to 0.5 percent by weight. In addition to this, the bearing bush material 4 includes 3.5 to 5 percent by weight of copper and 0.4 to 0.6 percent by weight of tin. Apart from this, the bearing bush material 4 includes a residual component.

The bearing bush material 4 alternatively to the composition shown above corresponds to a composition explained in the following. The bearing bush material 4 comprises a content of carbon of 0.8 to 1.3 percent by weight and a content of sulphur of 0.2 to 0.4 percent by weight. Apart from this, the bearing bush material 4 includes nickel with a content of 1.3 to 2.5 percent by weight and molybdenum with a content of 0.8 to 1.2 percent by weight and manganese with a content of 0 to 0.5 percent by weight. Furthermore, the bearing bush material 4 includes a residual component.

The sintered bearing bush material 4 in the shown example has a density of 6.2 to 6.8 g per cm$^3$.

In the show example, the shaft material 7 of the shaft 2 corresponds to a composition explained in the following. The shaft material 7 includes carbon with a content of 0.4 to 0.5 percent by weight and silicon with a content of 2.7 to 3.3 percent by weight. Apart from this, the shaft material 7 includes manganese with a weight content of 0 to 0.6 percent by weight and chromium with a weight content of 8 to 10 percent by weight. In addition to this, the shaft material 7 comprises a content of nickel of 0 to 0.5 percent by weight and a content of phosphorus of 0 to 0.04 percent by weight. Apart from this, the shaft material 7 includes sulphur with a content of 0 to 0.03 percent by weight and a residual component.

Alternatively to the composition of the shaft material 7 shown above, the shaft material 7 corresponds to the composition explained in the following. The shaft material 7 includes a content of carbon of 0.45 to 0.55 percent by weight and a content of silicon of 0 to 0.45 percent by weight. Apart from this, the shaft material 7 comprises manganese with a content of 8 to 10 percent by weight and chromium with a content of 20 to 22 percent by weight. Apart from this, the shaft material 7 includes nickel with a content of 3.5 to 5.5 percent by weight and phosphorus with a content of 0 to 0.04 percent by weight. Furthermore, the shaft material 7 comprises a content of sulphur of 0 to 0.03 percent by weight and a content of nitrogen of 0.4 to 0.6 percent by weight. Apart from this, the shaft material 7 includes a content of niobium of 1.8 to 2.5 percent by weight and a content of tungsten of 0.8 to 1.5 percent by weight. Furthermore, the shaft material 7 comprises a residual component.

Alternatively to the compositions of the shaft material 7 shown above, the shaft material 7 corresponds to the composition explained in the following. The shaft material 7 includes 0 to 0.08 percent by weight of carbon and a content of silicon of 0 to 0.5 percent by weight. Furthermore, the shaft material 7 comprises manganese with a content of 0 to 0.5 percent by weight and chromium with a content of 13.5 to 15.5 percent by weight. Apart from this, the shaft material 7 includes a nickel content of 30 to 33.5 percent by weight and phosphorus with a content of 0 to 0.015 percent by weight. Apart from this, the shaft material 7 comprises sulphur with a content of 0 to 0.01 percent by weight and aluminium with a content of 1.6 to 2.2 percent by weight. In addition to this, the shaft material 7 includes niobium with a content of 0.4 to 0.9 percent by weight and titanium with a content of 2.3 to 2.9 percent by weight. In addition to this, the shaft material 7 includes molybdenum with a content of 0.4 to 1.0 percent by weight and a residual component.

Alternatively to the compositions explained above, the shaft material 7 corresponds to a composition described in the following. The shaft material 7 includes carbon with a content of 0.25 to 0.35 percent by weight. Apart from this, the shaft material 7 includes a content of silicon of 0 to 0.3 percent by weight and manganese of 4 to 6 percent by weight and a content of chromium of 24 to 26 percent by weight. In addition to this, the shaft material 7 includes nickel with a content of 10 to 13 percent by weight and phosphorus with a content of 0 to 0.2 percent by weight. The shaft material 7 additionally comprises sulphur with a content of 0 to 0.2 percent by weight and aluminium with a content of 0 to 0.5 percent by weight. Furthermore, the shaft material 7 includes copper with a content of 0 to 0.5 percent by weight and niobium with a content of 1.8 to 2.5 percent by weight. In addition to this, the shaft material 7 comprises nitrogen with a content of 0.5 to 0.7 percent by weight and a residual component.

The residual component of the shaft material 7 contains 26.315 percent by weight to 88.9 percent by weight. The residual component of the bearing bush material 4 contains 89.5 percent by weight to 96.9 percent by weight of iron. There, the residual component consists of iron and contaminations. The contaminations can be contained in the residual component due to the manufacture. The remaining weight content of the residual component is formed by iron.

Alternatively to the compositions of the shaft material 7 shown above, the shaft material 7 corresponds to a composition shown in the following. The shaft material 7 comprises a content of carbon of 0 to 0.13 percent by weight and a content of silicon of 0 to 1 percent by weight. Furthermore, the shaft material includes manganese with a content of 0 to 1 percent by weight and chromium with a content of 18 to 21 percent by weight. The shaft material 7 includes cobalt with a content of 15 to 21 percent by weight and phosphorus with a content of 0 to 0.015 percent by weight. In addition to this, the shaft material 7 includes sulphur with a content of 0 to 0.02 percent by weight and aluminium with a content of 1 to 2 percent by weight. The shaft material 7 additionally comprises a content of copper of 0 to 0.2 percent by weight and a content of titanium of 2 to 3 percent by weight. Apart from this, the shaft material 7 includes zirconium with a content of 0 to 0.15 percent by weight as well as boron with a content of 0 to 0.02 percent by weight. In addition to this, the shaft material 7 includes iron with a content of 0 to 1.5 percent by weight and a residual component. The residual component contains 48.965 percent by weight to 64 percent by weight of nickel. The residual component consists of nickel and contaminations. The contaminations can be introduced into the residual component due to the manufacture during the manufacture of the shaft material 7. The remaining weight content of the residual component is formed by nickel.

The residual component in the compositions both of the bearing bush material 4 and also of the shaft material 7 explained above includes maximally 0.2 percent by weight of contaminations.

Alternatively to the compositions of the shaft material 7 shown above, the shaft material 7 is a case-hardened steel.

The sliding bearing 1 illustrated in the FIGURE is produced by means of a method according to the invention for producing a sliding bearing 1 according to the invention. This method provides that the oil is introduced into the residual porosity in an impregnating operation for the at least partial filling of the residual porosity of the sintered bearing bush material 4 at a pressure of 1 mbar to 850 mbar, for example of 10 mbar to 250 mbar and at an oil temperature of 42° Celsius to 97° Celsius, for example 60° Celsius to 90° Celsius.

As already mentioned above, an example of an internal combustion engine 5 according to the invention is additionally illustrated in the FIGURE, which can be practically employed in a motor vehicle. The internal combustion engine 5 comprises a gas exchange valve 8. The gas exchange valve 8 of the internal combustion engine 5 includes a valve stem 9. The internal combustion engine 5 additionally comprises a sliding bearing 1 according to the invention in accordance with the above description, the shaft 2 of which in the shown example comprises the valve stem 9. Here, the sliding bearing 1 of the internal combustion engine 5 is produced according to the method according to the invention explained above.

As already addressed above, an example of an electric machine 6 according to the invention is roughly schematically shown in the FIGURE, which electric machine 6 can be practically employed for a motor vehicle. Accordingly, the electric machine 6 comprises a sliding bearing 1 according to the invention in accordance with the above description, which is likewise produced by means of the method according to the invention likewise described above. The electric machine 6 additionally comprises a stator 10 and a rotor 11. The rotor 11 in the shown example is rotatably mounted on the stator 10 relative to the stator 10 by means of the sliding bearing 1.

The invention claimed is:

1. A sliding bearing, comprising:
   an uncoated shaft including a shaft material;
   a bearing bush including a sintered bearing bush material, the shaft slidingly and moveably guided, relative to the bearing bush, within the bearing bush;
   wherein the bearing bush material has a residual porosity of 8 percent or more; and
   wherein a volume of the residual porosity is filled with an oil up to 80 percent or more.

2. The sliding bearing according to claim 1, wherein the volume of the residual porosity is filled up to 90 percent or more with the oil.

3. The sliding bearing according to claim 1, wherein the bearing bush material has a composition including:
   1.8 to 2.2 percent by weight of carbon;
   0.2 to 0.5 percent by weight of phosphorus;
   3.5 to 5 percent by weight of copper;
   0.4 to 0.6 percent by weight of tin; and
   a residual component.

4. The sliding bearing according to claim 3, wherein the residual component includes 26.315 percent by weight to 96.9 percent by weight of iron.

5. The sliding bearing according to claim 3, wherein the residual component includes iron and contaminations.

6. The sliding bearing according to claim 3, wherein a remaining weight content of the residual component is formed by iron.

7. The sliding bearing according to claim 1, wherein the bearing bush material has a composition including:
   0.8 to 1.3 percent by weight of carbon;
   0.2 to 0.4 percent by weight of sulphur;
   1.3 to 2.5 percent by weight of nickel;
   0.8 to 1.2 percent by weight of molybdenum;

0 to 0.5 percent by weight of manganese; and a residual component.

8. The sliding bearing according to claim 1, wherein the sintered bearing bush material has a density of 6.2 to 6.8 g/cm³.

9. The sliding bearing according to claim 1, wherein the shaft material has a composition including:
0.4 to 0.5 percent by weight of carbon;
2.7 to 3.3 percent by weight of silicon;
0 to 0.6 percent by weight of manganese;
8 to 10 percent by weight of chromium;
0 to 0.5 percent by weight of nickel;
0 to 0.04 percent by weight of phosphorus;
0 to 0.03 percent by weight of sulphur; and
a residual component.

10. The sliding bearing according to claim 1, wherein the shaft material has a composition including:
0.45 to 0.55 percent by weight of carbon;
0 to 0.45 percent by weight of silicon;
8 to 10 percent by weight of manganese;
20 to 22 percent by weight of chromium;
3.5 to 5.5 percent by weight of nickel;
0 to 0.04 percent by weight of phosphorus;
0 to 0.03 percent by weight of sulphur;
0.4 to 0.6 percent by weight of nitrogen;
1.8 to 2.5 percent by weight of niobium;
0.8 to 1.5 percent by weight of tungsten; and
a residual component.

11. The sliding bearing according to claim 1, wherein the shaft material has a composition including:
0 to 0.08 percent by weight of carbon;
0 to 0.5 percent by weight of silicon;
0 to 0.5 percent by weight of manganese;
13.5 to 15.5 percent by weight of chromium;
30 to 33.5 percent per by weight of nickel;
0 to 0.015 percent by weight of phosphorus;
0 to 0.01 percent by weight of sulphur;
1.6 to 2.2 percent by weight of aluminium;
0.4 to 0.9 percent by weight of niobium;
2.3 to 2.9 percent by weight of titanium;
0.4 to 1.0 percent by weight of molybdenum; and
a residual component.

12. The sliding bearing according to claim 1, wherein the shaft material has a composition including:
0.25 to 0.35 percent by weight of carbon;
0 to 0.3 percent by weight of silicon;
4 to 6 percent by weight of manganese;
24 to 26 percent by weight of chromium;
10 to 13 percent by weight of nickel;
0 to 0.2 percent by weight of phosphorus;
0 to 0.2 percent by weight of sulphur;
0 to 0.5 percent by weight of aluminium;
0 to 0.5 percent by weight of copper;
1.8 to 2.5 percent by weight of niobium;
0.5 to 0.7 percent by weight of nitrogen; and
a residual component.

13. The sliding bearing according to claim 1, wherein the shaft material has a composition including:
0 to 0.13 percent by weight of carbon;
0 to 1 percent by weight of silicon;
0 to 1 percent by weight of manganese;
18 to 21 percent by weight of chromium;
15 to 21 percent by weight of cobalt;
0 to 0.015 percent by weight of phosphorus;
0 to 0.02 percent by weight of sulphur;
1 to 2 percent by weight of aluminium;
0 to 0.2 percent by weight of copper;
2 to 3 percent by weight of titanium;
0 to 0.15 percent by weight of zirconium;
0 to 0.02 percent by weight of boron;
0 to 1.5 percent by weight of iron; and
a residual component.

14. The sliding bearing according to claim 13, wherein the residual component includes 48.965 percent by weight to 64 percent by weight of nickel.

15. The sliding bearing according to claim 13, wherein the residual component includes nickel and contaminations.

16. The sliding bearing according to claim 13, wherein a remaining weight content of the residual component is formed by nickel.

17. The sliding bearing according to claim 1, wherein the residual component includes 0.2 percent by weight or less of contaminations.

18. The sliding bearing according to claim 1, wherein the shaft material is a case-hardened steel.

19. An internal combustion engine, comprising:
at least one gas exchange valve including a valve stem;
the sliding bearing according to claim 1; and
wherein the shaft of the sliding bearing includes the valve stem.

20. A method for producing a sliding bearing, comprising:
providing a bearing bush including a sintered bearing bush material having a residual porosity of at least 8 percent;
providing an uncoated shaft including a shaft material, the shaft slidingly and moveably guidable within the bearing bush; and
filling 80 percent or more of a volume of the residual porosity of the sintered bearing bush material with an oil via introducing the oil into the residual porosity in an impregnating operation at a pressure of 1 mbar to 850 mbar and at an oil temperature of 42° Celsius to 97° Celsius.

21. An electric machine, comprising:
a sliding bearing including an uncoated shaft and a bearing bush, the uncoated shaft including a shaft material, the bearing bush including a sintered bearing bush material having a residual porosity of 8 percent or more;
a stator;
a rotor rotatably mounted on the stator and rotatable relative to the stator via the sliding bearing;
wherein the shaft is slidingly and moveably guided, relative to the bearing bush, within the bearing bush; and
wherein a volume of the residual porosity is filled with an oil up to 80 percent or more.

* * * * *